Patented May 13, 1930

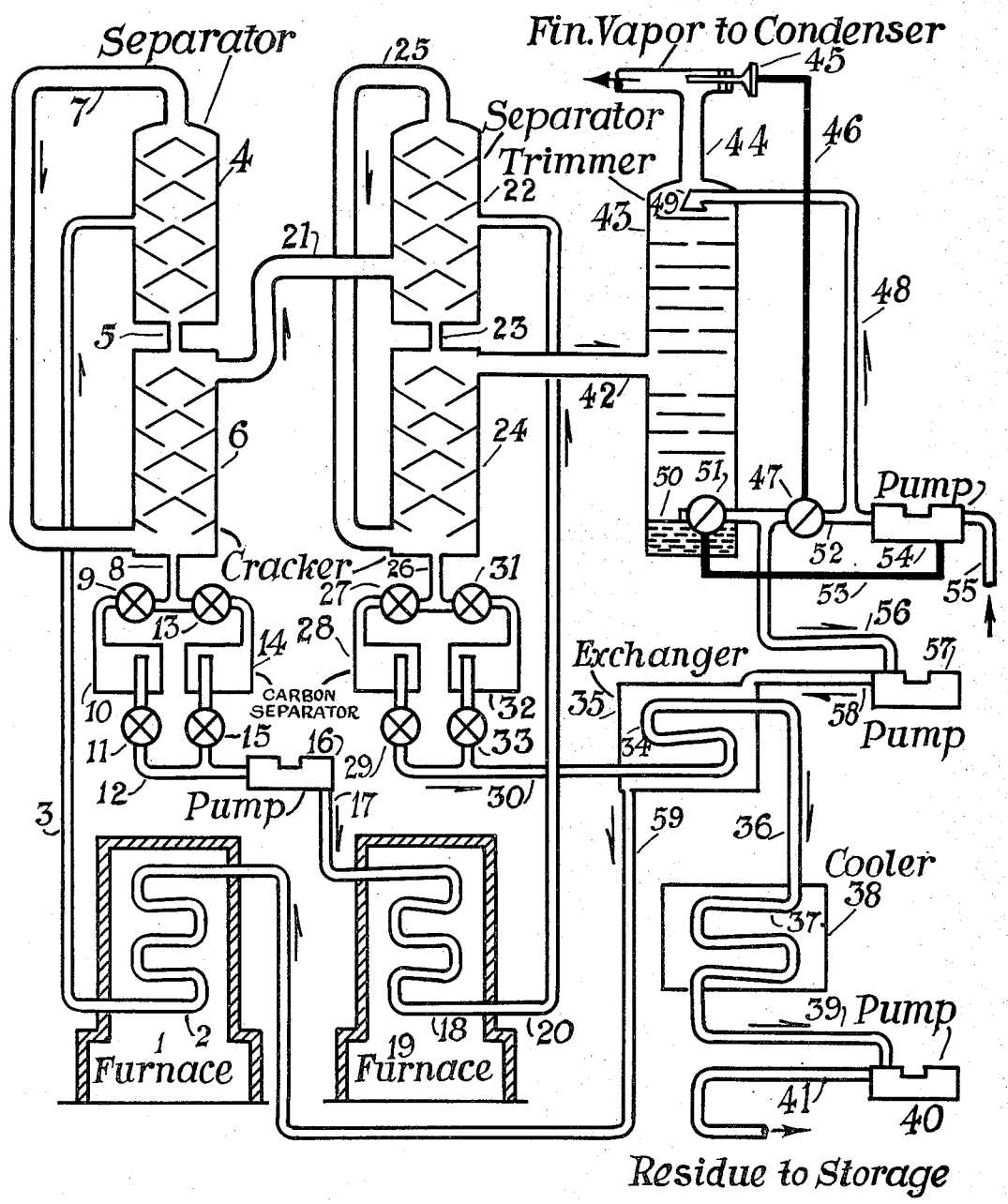

1,758,618

UNITED STATES PATENT OFFICE

PETER NACHTSHEIM, OF BARNSDALL, OKLAHOMA

PROCESS OF CRACKING PETROLEUM AND MINERAL OILS AND THEIR DIFFERENT FRACTIONS

Application filed May 8, 1926. Serial No. 107,809.

The present invention relates to a process for converting heavy hydrocarbon oils with high boiling points into lighter hydrocarbon oils with lower boiling points.

This process is a combination liquid and vapor phase process of cracking, and has for its object to render the cracking process more expeditious and considerably cheaper, and besides, reduces the formation of carbon and coke to a minimum, thus eliminating the losses due to shut-downs caused by the necessity of removing the carbon and coke.

My invention relates a method of distilling by suitable apparatus in such a manner that I get the benefit of heat exchange and the subsequent saving of fuel, and that I may at the same time get such advantage as can be obtained from cracking.

I attain these objects by the apparatus illustrated in the accompanying drawing. In the drawing the numeral 1 represents a pipe furnace through which the oil is passed through a series of tubes 2, then I bring the heated oil which up to now has not had a chance to separate into oil and vapor, due to the velocity of its travel through the tubes, by means of an open pipe 3, into an insulated separator 4, with inclined baffles where the lighter vapors separate and go up, and the heavy oils drop down and go to the bottom where the heavy oils are sufficiently collected to form a seal, thereby more effectively causing the vapors to take their natural upwardly directed course. Now, since the heavy oils are hotter than the vapors, I bring the vapors from the top of separator 4, by means of an open pipe 7, into the bottom of vapor cracker 6, and bring the heavier oils from the bottom of separator 4, by means of an open pipe 5, into the top of vapor cracker 6. Vapor cracker 6 is insulated and has inclined baffles which force the hotter heavier oils and cooler lighter vapors into minute contact with each other, and thus cracking or effecting the formation of lower boiling point oils, whose vapors rise to the top of vapor cracker 6. From the bottom of vapor cracker 6, the liquid is taken out directly by means of an open pipe 8, passing through an open valve 9, into a carbon separator 10, then through an open pipe 12, and open valve 11, to pump 16, valves 13 and 15 being shut and temporarily excluding a spare carbon separator 14. Carbon separator 10 can be cut out of the line by shutting valves 9 and 11, at the same time opening valves 13 and 15, thus allowing for cleaning of carbon separator 10, while carbon separator 14 is operating, thereby eliminating a shut-down. Pump 16 discharges the hot oil for further heating through an open pipe 17, into a heating coil 18 in a furnace 19, which is similar in construction and operation to furnace 1.

The reheated oil upon leaving furnace 19 is carried in an open pipe 20, to separator 22 with inclined baffles. Here vapors and oil again separate.

The vapors that rise to the top of vapor cracker 6, are carried in an open pipe 21 to the bottom of separator 22. The vapors from vapor cracker 6, and those arising from the hot oil mingle and rise to the top. The hot oil leaves the bottom of separator 22 by gravity through an open pipe 23 and enters vapor cracker 24 at the top. The vapors leave separator 22 at the top and by means of an open pipe 25 are carried to the bottom of vapor cracker 24 with inclined baffles. Vapor crackers 6 and 24 are similar in construction and operation, the intimate contact of vapors and oil effecting additional cracking. The hot oil leaves vapor cracker 24 at the bottom by gravity, and enters carbon separator 28 by means of an open pipe 26, and an open valve 27, then leaves the separator by means of an open valve 29 and an open pipe 30. Valves 31 and 33 are shut by-passing separator 32. Either one of separators 28 or 32 can be cut out of the line for cleaning purposes. The residual hot oil is led to heat exchanger 35 where the charging stock is the cooling medium, and carried through cooling coil 34 on to cooler 38 where water is the cooling medium, then through cooling coil 37 on to an open pipe 39 to a pump 40, which discharges the residual heavy oil through an open pipe 41 to storage.

The vapors leave vapor cracker 24 at the top and enter trimmer 43 by means of an open pipe 42 near the middle. The trimmer has horizontal baffles and is insulated. The vapors rise through the baffles to the outlet 44, where a temperature control 45 re-acts by means of a suitable connection 46 on a valve 47 in a by-pass 52 from the charging line 48. Assuming that it is desired to carry over all fractions whose boiling points are below 360° Fahrenheit, then as long as the temperature of the vapors is below 360° F., the by-pass shut off valve is wide open; all the charging stock going directly to charging pump 57, by means of pipe 56. As the temperature increases to or above 360° F., the temperature control will partially shut the by-pass valve 47, and allow the charging stock to enter the top of trimmer 43, by means of a spray nozzle 49, and by mingling with the rising vapors cool them and reduce them to the desired temperature. Any low boiling point hydrocarbons which directly vaporize from the charging stock will go over with the other vapors, thus by-passing the furnaces, towers and all other equipment with a consequent saving of fuel and other costs.

This spraying with charging stock will act as a stabilizer to the whole system, since if the whole system should run a little high on temperature, the increased spraying will get the benefit from it, or in other words, the system has a compensating stabilizer.

The knock-back, or condensed vapors in the trimmer plus the heated charging stock that might have been sprayed over collect in the bottom of the trimmer. As soon as the liquid reaches a predetermined level it overflows and connects to the discharge of charging pump 54, and at the same time a level control 51 through the link connection 55 pinches down charging pump 54, so that the volume going to charging pump 57 is the same all the time. Charging pump 57 pumps the liquid through a pipe 58 into exchanger 35, and then through pipe 59 into furnace 1, and then the cycle repeats. Vapors are taken over at the required temperature and either fractionated and condensed or directly condensed and then put into storage.

The apparatus for effecting distillation and cracking in the manner described may be arranged in various combinations, numbers and ways. The accompanying drawing shows one form of arrangement of the apparatus for this purpose.

By regulating the heat to which the retorts or furnaces are subjected and suitably setting the temperature control 45, the character of the distillate may be varied, whereby distillates more or less light can be obtained to suit various needs, and also the proportions of the parts may be varied.

Having described my invention, what I claim is:

1. The process of cracking oil comprising, heating the oil to a cracking temperature in a primary heating zone, separating the oil into a vapor and residual oil in a primary separating zone, contacting by countercurrent flow the vapor with said residual oil at a cracking temperature in an enlarged passageway thereby producing a second vapor and second residual oil, further heating said second residual oil in a secondary heating zone, conducting said second vapor countercurent through the further heated second residual oil in a secondary separating zone thereby separating a third vapor and third residual oil, and thereafter contacting said third vapor and said third residual oil by countercurrent flow.

2. The process of cracking oil comprising, heating the oil to a cracking temperature in a primary heating zone, separating the oil into a vapor and residual oil in a primary separating zone, discharging the residual oil downwardly through an enlarged passageway, passing the vapor upwardly through the falling residual oil to produce a second vapor and second residual oil, withdrawing and further heating said second residual oil in a secondary heating zone and thereafter separating the vapors from the oil in a secondary separating zone, conducting said second vapor countercurrent to the heated residual oil in said secondary separating zone thereby separating a third vapor and residual oil, and taking off the vapors of the process.

3. The process of cracking oil comprising, heating the oil to a cracking temperature in a primary heating zone, separating the oil into a vapor and residual oil in a primary separating zone, contacting by countercurrent flow the vapor with said residual oil at a cracking temperature in an enlarged passageway, thereby producing a second vapor and residual oil, discharging the second residual oil into a settling zone to remove the carbon therefrom, withdrawing and further heating said cleaned second residual oil in a secondary heating zone, conducting the second vapor countercurrent to the cleaned further heated second residual oil in a secondary separating zone and thereby forming a third vapor and third residual oil.

4. The process of cracking oil comprising, heating the oil to a cracking temperature in a primary heating zone, separating the vapor and residual oil in a primary separating zone, discharging the residual oil downwardly through an enlarged passageway, passing the vapor upwardly through the falling residual oil to produce a second vapor and second residual oil, discharging the second residual oil into a settling zone to remove the carbon therefrom, withdrawing and further heating said cleaned second residual oil in a secondary heating zone and thereafter separating the vapors from the residual oil in a secondary separating zone, conducting said second vapor countercurrent to the heated cleaned residual oil in said secondary separating zone thereby separating a third vapor and residual oil. and taking off the vapors of the process.

PETER NACHTSHEIM.